(12) United States Patent
White et al.

(10) Patent No.: US 6,771,454 B2
(45) Date of Patent: Aug. 3, 2004

(54) SUSPENSION SENSE CAPABILITY FOR WINDAGE CONTROL

(75) Inventors: Andrew D. White, Eden Prairie, MN (US); Joel D. Limmer, Bloomington, MN (US); Wayne A. Bonin, North Oaks, MN (US); Zine-Eddine Boutaghou, Vadnais Heights, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 373 days.

(21) Appl. No.: 09/945,940

(22) Filed: Sep. 4, 2001

(65) Prior Publication Data

US 2002/0063989 A1 May 30, 2002

Related U.S. Application Data

(60) Provisional application No. 60/239,972, filed on Oct. 13, 2000.

(51) Int. Cl.[7] ................................................ G11B 5/596
(52) U.S. Cl. .................................. 360/77.03; 360/77.01
(58) Field of Search ........................ 360/75, 76, 77.01, 360/77.02, 77.03, 77.04, 77.05

(56) References Cited

U.S. PATENT DOCUMENTS

| | | | |
|---|---|---|---|
| 4,040,103 A | 8/1977 | White | 360/75 |
| 4,135,217 A | 1/1979 | Jacques et al. | 360/77 |
| 4,536,809 A | 8/1985 | Sidman | 360/77 |
| 4,616,276 A | 10/1986 | Workman | 360/77 |
| 4,862,298 A | 8/1989 | Genheimer et al. | 360/60 |
| 5,235,472 A | 8/1993 | Smith | 360/60 |
| 5,299,075 A | 3/1994 | Hanks | 360/77.02 |
| 5,373,213 A | 12/1994 | Smith | 310/355 |
| 5,404,253 A | 4/1995 | Painter | 360/77.04 |
| 5,426,545 A | 6/1995 | Sidman et al. | 360/78.09 |
| 5,521,772 A | 5/1996 | Lee et al. | 360/75 |
| 5,526,208 A | 6/1996 | Hatch et al. | 360/109 |
| 5,585,976 A | 12/1996 | Pham | 360/77.04 |
| 5,592,346 A | 1/1997 | Sullivan | 360/77.04 |
| 5,602,689 A | 2/1997 | Kadlec et al. | 360/78.04 |
| 5,663,847 A * | 9/1997 | Abramovitch | 360/77.02 |
| 5,854,722 A | 12/1998 | Cunningham et al. | 360/77.04 |
| 5,862,015 A | 1/1999 | Evans et al. | 360/104 |
| 5,875,066 A | 2/1999 | Ottesen | 360/77.11 |

(List continued on next page.)

FOREIGN PATENT DOCUMENTS

| | | |
|---|---|---|
| EP | 0 594 522 A1 | 4/1994 |
| EP | 0 735 522 B1 | 10/1996 |
| WO | WO 00/42603 | 7/2000 |

OTHER PUBLICATIONS

"Multi–Sensing Servo–with Carriage–Acceleration Feedback for Magnetic Disk Drives" by Kobayashi et al., American Control Conference in Philadelphia, Pennsylvania, pp. 3038–3042 (Jun. 1998).*

"Adaptive Accelerometer Feedforward Servo for Disc Drives" by Satinderpall Pannu et al., presented IEEE conference, 3 pages (1997).

"Rejecting Rotational Disturbances on Small Disc Drives Using Rotational Accelerometers" by Daniel Y. Abramovitch, IFAC World Congress in Sand Franciso, CA, pp. 1–6 (Jul. 1996).

Primary Examiner—David Hudspeth
Assistant Examiner—Jason Olson
(74) Attorney, Agent, or Firm—Theodore M. Magee; Westman, Champlin & Kelly, P.A.

(57) ABSTRACT

A method and data storage device are provided that reduce off-track motion due to resonant modes in the storage device. The off-track motion is reduced by sensing movement with a sensor located on a suspension assembly of the storage device. Based on this sensed movement, the sensor generates a signal that is used to drive a control system to minimize the off-track motion.

15 Claims, 5 Drawing Sheets

U.S. PATENT DOCUMENTS

| | | | | |
|---|---|---|---|---|
| 6,064,540 A | * | 5/2000 | Huang et al. | 360/75 |
| 6,088,187 A | * | 7/2000 | Takaishi | 360/78.05 |
| 6,304,409 B1 | * | 10/2001 | Allsup | 360/77.03 |
| 6,335,845 B1 | * | 1/2002 | Yamaguchi et al. | 360/75 |
| 6,341,048 B1 | * | 1/2002 | Morris et al. | 360/77.08 |
| 6,407,876 B1 | * | 6/2002 | Yamaguchi et al. | 360/75 |
| 6,414,813 B2 | * | 7/2002 | Cvancara | 360/77.02 |
| 6,493,172 B1 | * | 12/2002 | Morris et al. | 360/77.02 |
| 6,580,579 B1 | * | 6/2003 | Hsin et al. | 360/77.02 |
| 6,583,964 B1 | * | 6/2003 | Huang et al. | 360/294.4 |

* cited by examiner

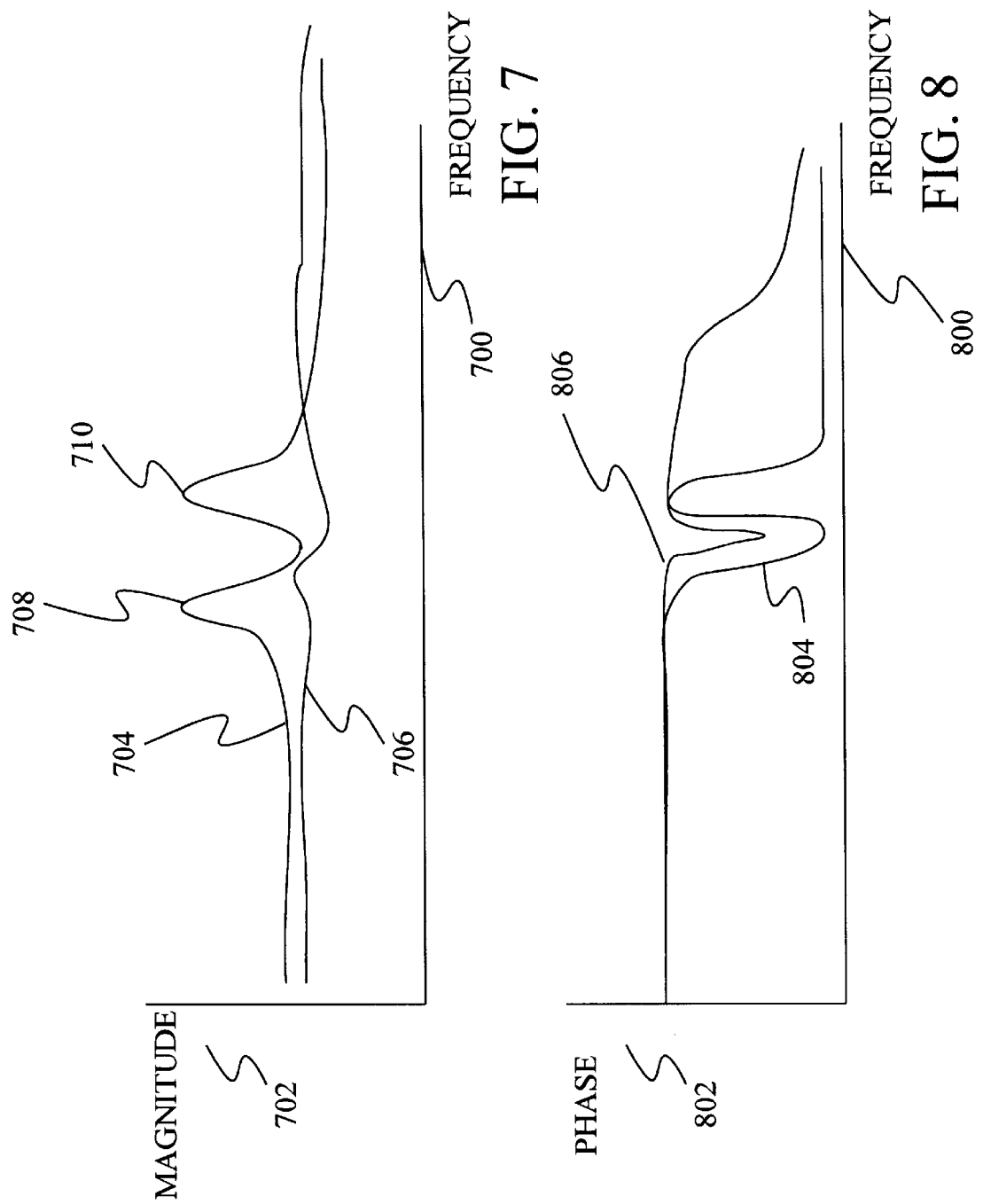

SUSPENSION SENSE CAPABILITY FOR WINDAGE CONTROL

CROSS-REFERENCE TO RELATED APPLICATION

This application claims priority from U.S. Provisional Application No. 60/239,972, filed Oct. 13, 2000 and entitled SUSPENSION SENSE CAPABILITY FOR WINDAGE CONTROL.

FIELD OF THE INVENTION

The present invention relates to data storage devices. In particular, the present invention relates to positioning heads in data storage devices.

BACKGROUND OF THE INVENTION

In data storage devices with movable heads, the position of the head is controlled using a servo control feedback loop. The control loop receives a reference signal that indicates the desired position for the recording head. This signal is combined with a position signal generated by the recording head that indicates the current position of the head to create a position error signal that indicates the distance between the desired position and the current position. Based on the position error signal, a controller in the loop issues control signals to one or more positioning units such as a voice coil motor (VCM) and microactuators to move the head toward the desired position.

Ideally, the servo loop would have complete control over the position of the head. However, in actual storage devices, the position of the head can be changed by other forces such as external forces applied to the data storage unit, and mechanical resonance in the structures that support the head.

To prevent off-track head motion caused by these forces, the prior art has suggested placing a sensor on a suspension assembly to sense motion of the suspension assembly relative to the end of an actuator arm. In particular, U.S. Pat. No. 5,862,015 shows a suspension sensor that detects strain in the suspension assembly caused by movement of the head relative to the actuator arm.

Although the prior art suggests that a sensor signal from a suspension sensor can be used to reduce off-track motion of the head, it does not describe the details of a control system that can perform this function. In particular, the patent provides no guidance as to how to build a control system that is able to filter head movement caused by external sources and resonance from head movement caused by an actuator.

Thus, a control system is needed that can be used to position a head based on information from a suspension sensor.

SUMMARY OF THE INVENTION

A method and data storage device are provided that reduce off-track motion due to resonant modes in the storage device. The off-track motion is reduced by sensing movement with a sensor located on a suspension assembly of the storage device. Based on this sensed movement, the sensor generates a signal that is used to drive a control system to minimize the off-track motion.

Additional features and benefits will become apparent upon a review of the following figures and their accompanying detailed description.

BRIEF DESCRIPTION OF THE DRAWINGS

FIG. 7 is a graph showing the effects of the second stage feedback on the magnitude of the transfer function of the servo plant.

FIG. 8 is a graph showing the effects of the second stage feedback on the phase of the transfer function of the servo plant.

DETAILED DESCRIPTION OF ILLUSTRATIVE EMBODIMENTS

Figure 1:
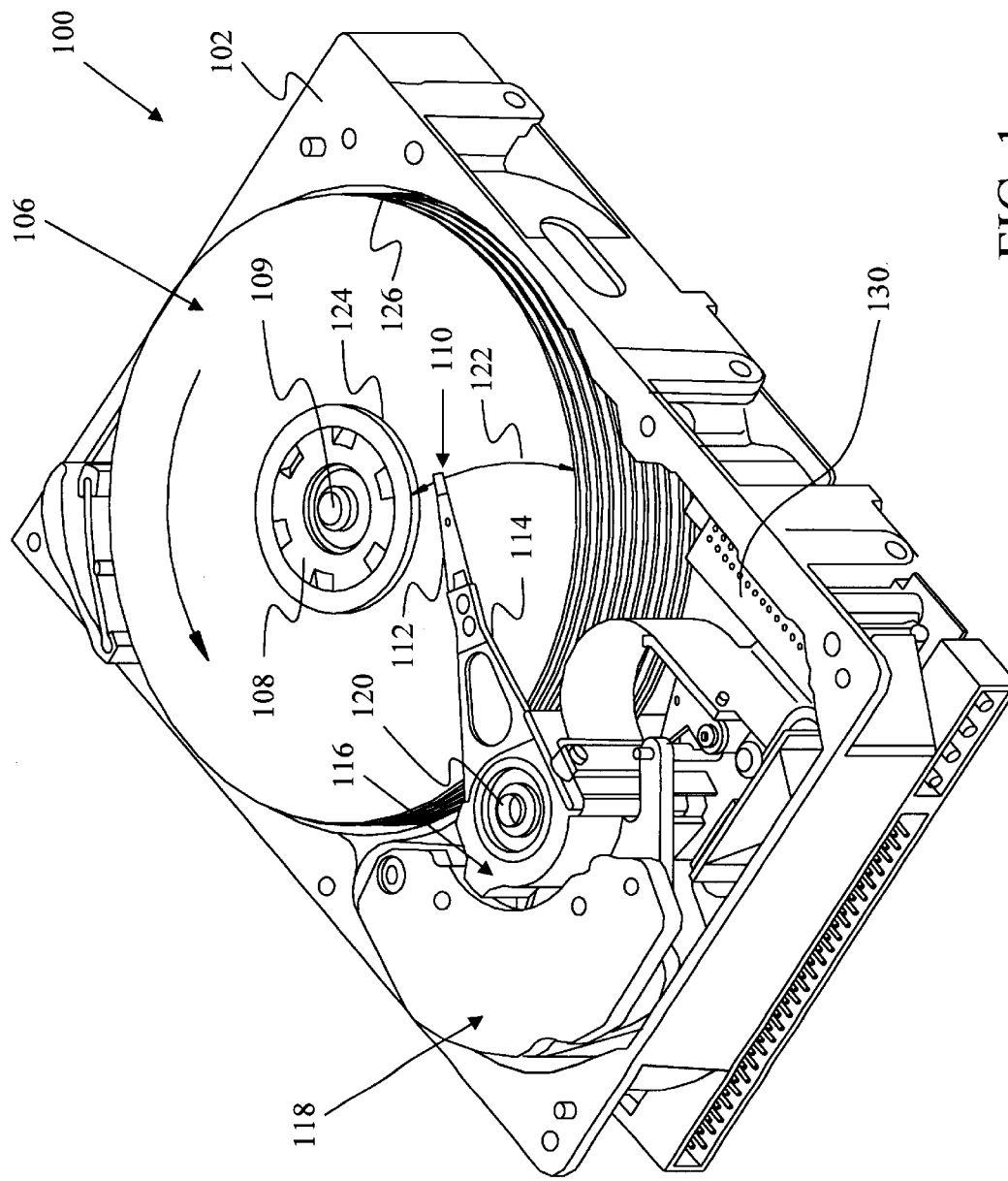
FIG. 1 is a plan view of a data storage device in which embodiments of the present invention may be practiced.

FIG. 1 is a perspective view of a disc drive 100 in which the present invention is useful. Disc drive 100 includes a housing with a base 102 and a top cover (not shown). Disc drive 100 further includes a disc pack 106, which is mounted on a spindle motor (not shown), by a disc clamp 108. Disc pack 106 includes a plurality of individual discs 107, which are mounted for co-rotation about central axis 109. Each disc surface has an associated disc head-slider 110 that is mounted to disc drive 100 for communication with the confronting disc surface. Head-slider 110 includes a slider structure arranged to fly above the associated disc surface of an individual disc of disc pack 106, and a transducing head 111 arranged to write data to, and read data from, concentric tracks on the confronting disc surface. The concentric tracks are, in effect, parallel to each other at different radii on the disc. In the example shown in FIG. 1, head-sliders 110 are supported by suspensions 112 which are in turn attached to track accessing arms 114 of an actuator 116. Actuator 116 is driven by a voice coil motor (VCM) 118 to rotate the actuator, and its attached heads 110, about a pivot shaft 120. Rotation of actuator 116 moves the heads along an arcuate path 122 to position the heads over a desired data track between a disc inner diameter 124 and a disc outer diameter 126. Voice coil motor 118 is driven by servo electronics included on circuit board 130 based on signals generated by the heads of head-sliders 110 and a host computer (not shown). Read and write electronics are also included on circuit board 130 to supply signals to the host computer based on data read from disc pack 106 by the read heads of head-sliders 110, and to supply write signals to the write head of head-sliders 110 to write data to the discs.

Figure 2:
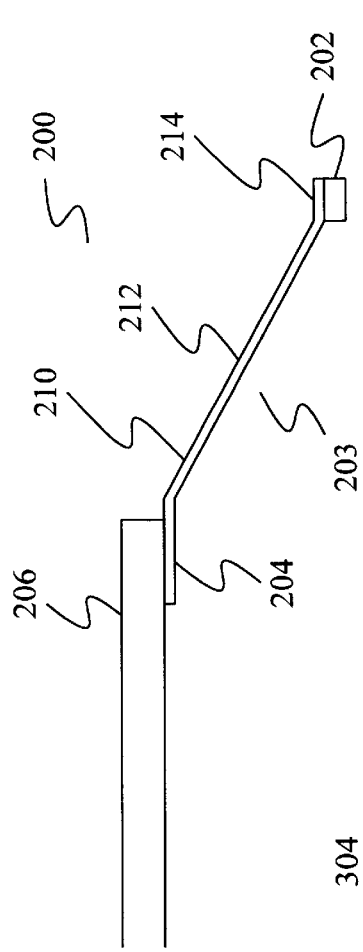
FIG. 2 is a side view of a suspension for a head under embodiments of the present invention.
Figure 3:
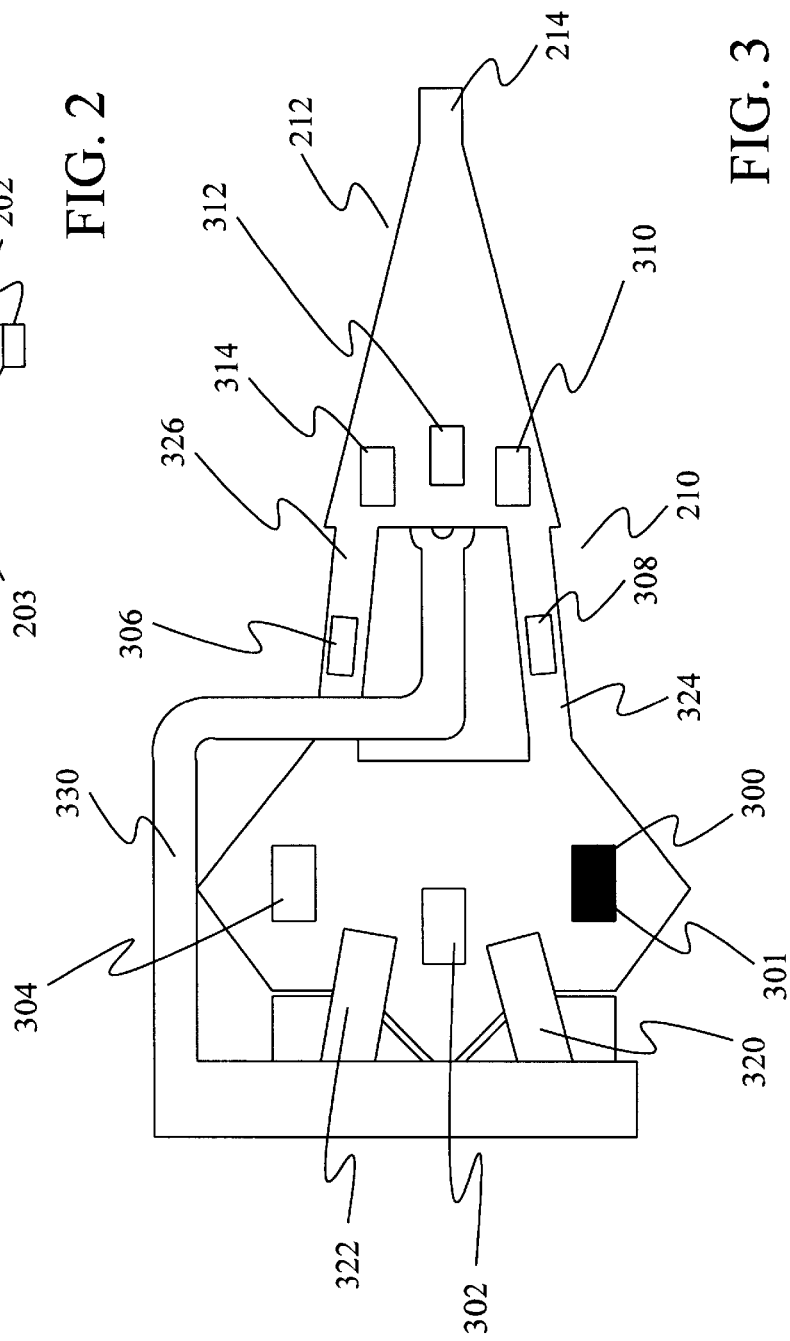
FIG. 3 is a top view of a suspension for a head showing locations for a sensor under embodiments of the present invention.

FIGS. 2 and 3 are a side view and top view, respectively, of a suspension assembly 200 for supporting a head 202. Suspension assembly 200 includes a load beam 203 having a boss plate 204 that connects to a support arm 206 through a boss (not shown). Load beam 203 includes a flexure portion 210, a rigid portion 212, and a gimbal portion 214. Gimbal portion 214 connects to head 202.

Under embodiments of the present invention, a sensor is placed on the suspension assembly to provide information that indicates the forces experienced by the suspension assembly. As discussed further below, the sensor's signals are used to cancel or reduce the effects of external forces, windage and mechanical resonances on the position of the head.

FIG. 3 shows several possible locations 300, 302, 304, 306, 308, 310, 312 and 314 for a sensor under embodiments of the present invention. Locations 300, 302 and 304 are located on the load beam between flexure arms 324 and 326 and boss plate 204, locations 306 and 308 are located on flexure arms 324 and 326, and locations 310, 312 and 314 are located along rigid portion 212. In FIG. 3 a suspension sensor 301 is shown at location 300.

Although specific locations are shown, the sensors may be placed on any location along the suspension assembly, including on flex circuit 330, which supports electrical wires that connect the head to circuits in the storage device.

Under the present invention, the sensor placed on the suspension assembly can be one of many types including accelerometers and strain gauge sensors. In particular, embodiments of the invention use pressure sensors, capacitive plate position sensors, Micro Electro Mechanical System (MEMS) accelerometer, MEMS-based piezo-resistive sensor and polyvinylidene fluoride (PVDF) film sensor. In embodiments where a strain gauge is used, the strain gauge is often placed at a point on the suspension assembly that experiences high strain.

Figure 4:
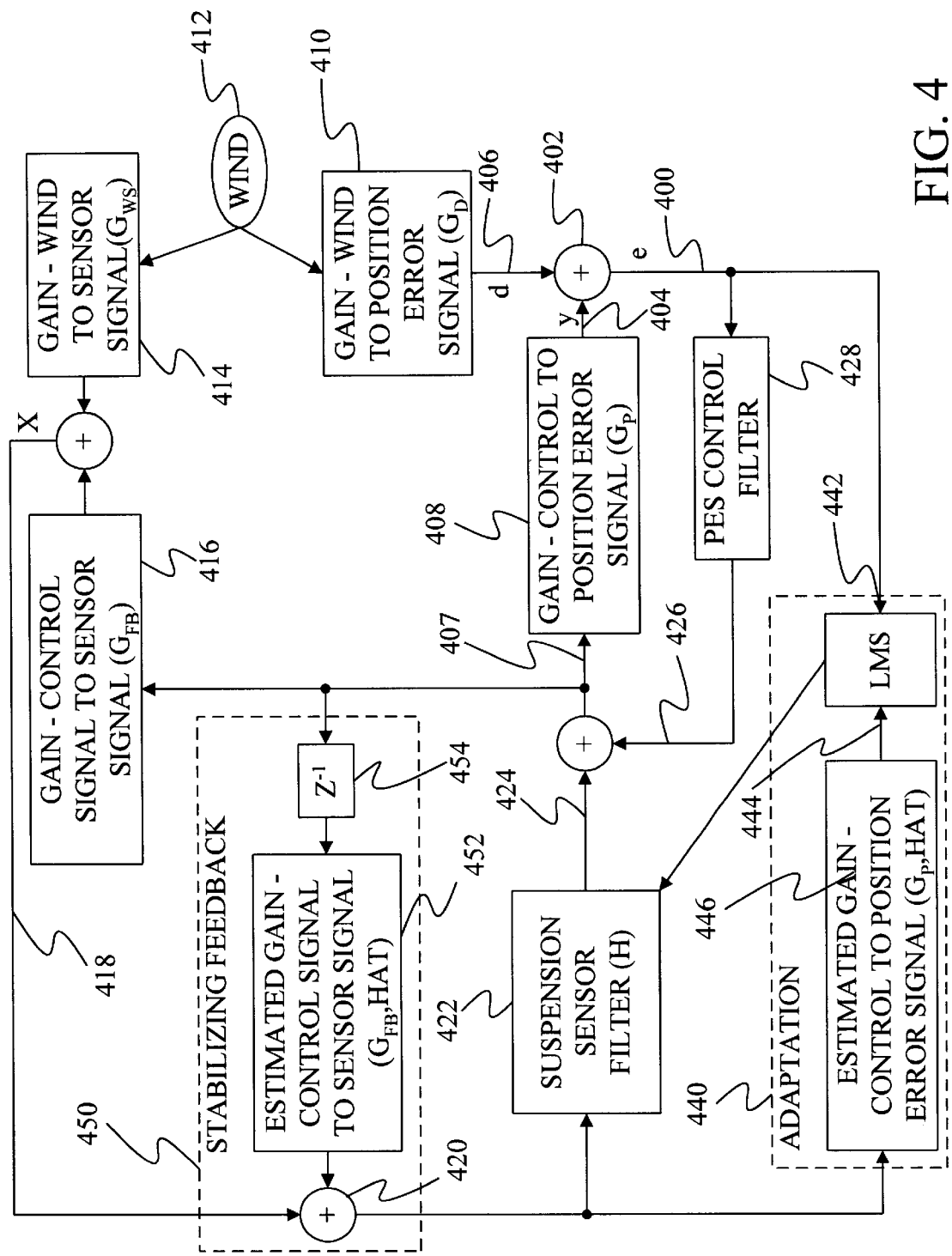
FIG. 4 is a diagram of a servo loop and feedforward controller under one embodiment of the present invention.

FIG. 4 provides a block diagram of a servo control system with a feedforward controller that utilizes a suspension sensor of the present invention. In FIG. 4, the servo control system is described in terms of signals found in the control system and gains between those signals. Thus, the blocks shown provide a gain while the paths between the blocks represent a signal or a component of a signal.

In FIG. 4, windage induced pressure 412 on the suspension assembly acts as an input signal to two transfer functions 414 and 410. Transfer function 414 ($G_{ws}$) represents the relationship between windage disturbance 412 and position error signal 400 generated by the recording head. Gain 410 ($G_D$) represents the relationship between the windage disturbance 412 and the sensor signal produced by the suspension sensor. In general, each of these transfer functions relate an energy input to a sensed unit measured at an output location. In particular, the transfer functions reflect the movement caused by resonant modes of the suspension assembly when excited by windage disturbances.

The sensor signal and the position error signal are also affected by movement of the suspension assembly due to control signals 407 applied to the various actuators in the drive. The relationship between the sensor signal and control signals 407 is shown as gain 416 ($G_{fb}$) and the relationship between a component 404 of position error signal 400 and control signals 407 is shown as gain 408 ($G_p$).

Sensor signal 418, which results from transfer functions 414 and 416, passes through a summing node 420, described further below, and is provided as an input to a suspension sensor filter 422. Suspension sensor filter 422 uses sensor signal 418 to generate a control component 424 that forms part of control signals 407. Suspension sensor filter 422 is set so that control component 424 cancels, as much as possible, the wind induced movement of the head represented by position error signal component 406 generated by gain 410. Control component 424 is combined with a PES control component 426 generated by a PES control filter 428 based on a position error signal 400, which is formed from the combination of position error signal component 406 and position error signal component 404. Together, control components 424 and 426 form control signals 407.

Figure 5:
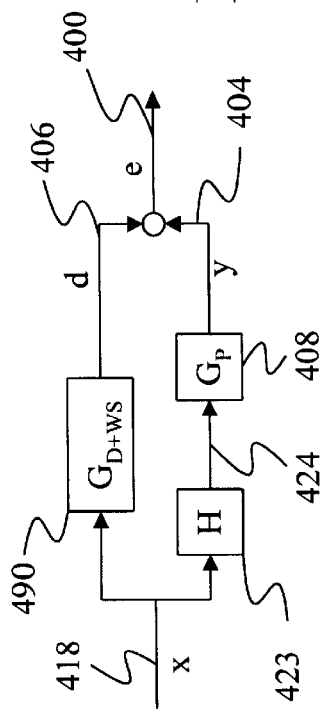
FIG. 5 is a simplified block diagram of the feedforward controller of FIG. 4.

FIG. 5 provides a simplified block diagram of the operation of the feedforward controller of FIG. 4. In FIG. 5, sensor signal 418 is depicted as an input, X, to suspension sensor filter 422, which has a transfer function H, and a transfer function 490, $G_{D+WS}$, which is a composite of transfer functions 414 and 410 of FIG. 4. Transfer function $G_{D+WS}$ represents the relationship between sensor signal 418 and position error signal component 406, which is depicted as position signal d in FIG. 5.

Suspension sensor filter 422 generates control signal 424, which drives plant 408. Plant 408 has a transfer function $G_p$ and produces a position error signal component 404, which is depicted as position signal y in FIG. 5.

In feedforward compensation, the transfer function of the suspension sensor filter is adjusted so that the difference between position signal d and position signal y, depicted as error signal e in FIG. 5, is minimized. In terms of an equation, the ideal feedforward control system attempts to achieve a result of:

$$e(n)=d(n)-y(n)=0 \qquad \text{Equation 1}$$

or in terms of the z-transforms of input signal x and the transfer functions of FIG. 5:

$$E(z)=0=G_D(z)X(z)-H(z)G_p(z)X(z) \qquad \text{Equation 2}$$

Thus, if the combined transfer function provided by suspension sensor filter 422 and plant 408 can be set equal to the transfer function between the sensor signal and the resulting movement of the recording head, the feedforward control will be able to cancel random noises very effectively.

The ability of suspension sensor filter 422 to cancel position error signal component 406 is limited by the amount of coherence between sensor signal 418 (x) and position signal 406 (d). This coherence can be represented mathematically as:

$$C(\omega) = \frac{|S_{dx}(\omega)|^2}{S_{dd}(\omega)S_{xx}(\omega)} \qquad \text{Equation 3}$$

where $\omega$ denotes frequency, $C(\omega)$ is the coherence, $S_{dx}(\omega)$ is the complex cross-power spectrum, that is, the Fourier transform of the cross-correlation function:

$$r_{dx}(k)=E[d(n)x(n-k)] \qquad \text{Equation 4}$$

and $S_{dd}(\omega)$ and $S_{xx}(\omega)$ are the autopower spectra of d(n) and x(n), respectively.

The coherence of Equation 3 will vary between zero and one, with one indicating strong coherence and zero indicating no coherence.

The performance of suspension sensor filter 422 is thus limited by the coherence between sensor signal 418 and the position error signal 406. In particular, the cancellation provided by suspension sensor filter 422 can at most reduce the effects of the wind induced resonance on the position error signal to a value $S_{ee}(\omega)$ as is defined as:

$$S_{ee}(\omega)=[1-C(\omega)]S_{dd}(\omega) \qquad \text{EQ.5}$$

where $S_{ee}(\omega)$ is the spectral representation of error signal e(n).

Under one embodiment, the parameters of suspension sensor filter 422 are set by estimating the various gains 414, 410, 416, 408 and 428 for the servo system as a function of frequency, and identifying the various resonant modes of the suspension assembly. The gains and the resonant frequencies are then used to select the filter parameters that will best cancel the resonant induced position error signal component 406.

In other embodiments, an adaptation unit 440, as shown in FIG. 4, is used to train the filter parameters of suspension sensor filter 422. In one embodiment, adaptation unit 440 includes a least means squares (LMS) gradient approach algorithm 442. The LMS algorithm receives the position error signal 400 and an estimated position error signal 444 generated by passing the sensor signal from the suspension sensor through an estimate 446 of control-to-position error signal gain 408.

Other adaptation algorithms may be used within the scope of the present invention. For example, recursive least squares (RLS), Neural Networks, and Fuzzy Logic Controllers may be used to adapt filter 422 under the present invention.

In some embodiments of the present invention, a stabilizing feedback unit 450 is provided to keep feedback transfer function 416 from destabilizing the servo system. In particular, since control signal 407 affects the sensor signal through transfer function 416, and the sensor signal is fed to suspension sensor filter 422 to form control signal 407, a loop is formed that can destabilize the servo system. To avoid this, stabilizing feedback unit 450 uses an estimation 452 of transfer function 416 and a delay unit 454. Together, estimated transfer function 452 and delay unit 454 provide a cancellation signal designed to cancel the effects of the control signal on sensor signal 418. The cancellation signal provided by stabilizing feedback unit 450 is added to sensor signal 418 at summing node 420.

Figure 6:
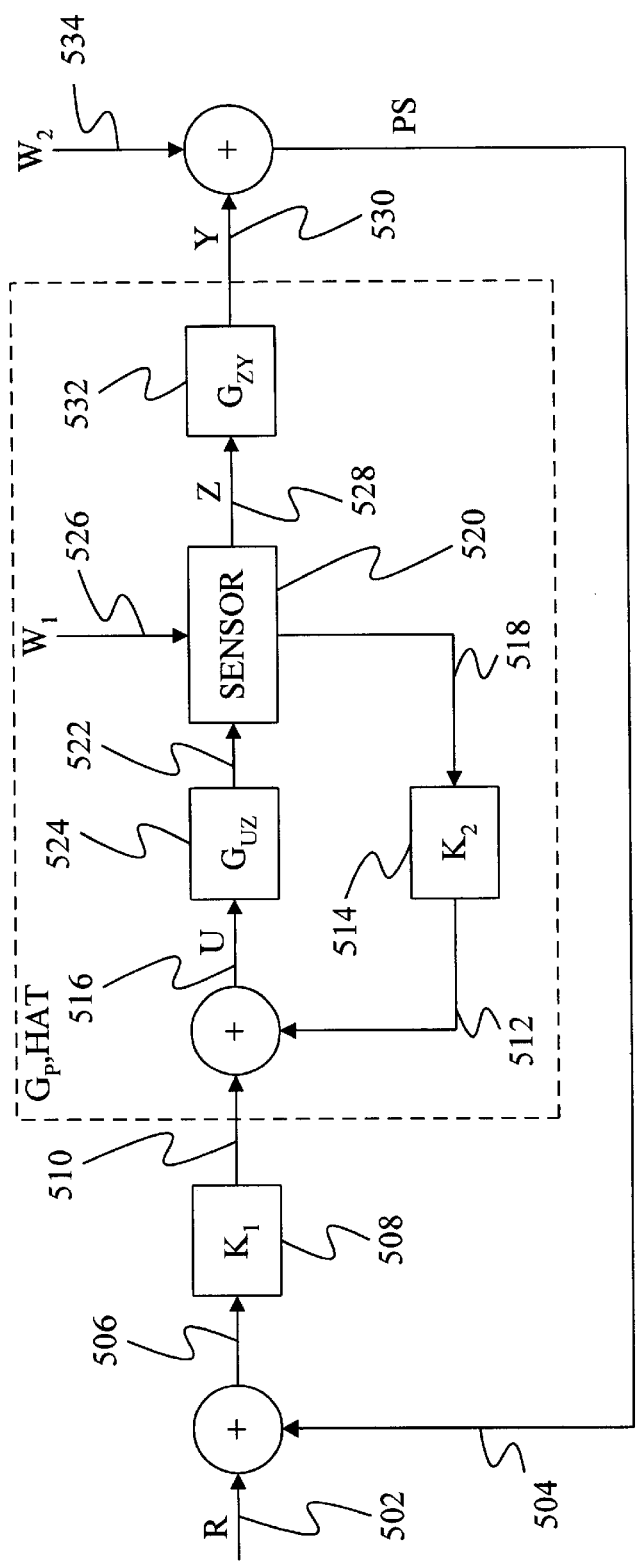
FIG. 6 is a diagram of a dual feedback system under one embodiment of the present invention.

In other embodiments, the suspension sensor is used as part of a dual-stage feedback loop such as feedback loop 500 of FIG. 6. In servo loop 500, a reference signal 502 is combined with a position signal 504 to generate a position error signal 506. Position error signal 506 is provided to a controller 508 that generates a PES control signal 510 based on the position error signal.

PES control signal 510 is combined with a sensor control signal 512 generated by a control unit 514 to produce a control signal 516. Sensor control signal 512 is generated based on a sensor signal 518 from a suspension sensor 520 of the present invention.

Control signal 516 is applied to one or more actuators that move the suspension assembly and the head. Based on the control signal 516, sensor 520 is moved a distance 522 due to a control signal-to-sensor movement gain 524. Sensor 520 is also moved by wind induced resonance 526 resulting in a total sensor movement 528. Based on this movement, sensor 520 generates signal 518.

Under one embodiment, controller 514 is programmed to produce a sensor control signal that cancels the resonant movement 526 of sensor 520. Thus, through sensor control signal 512, control signal 516 is adjusted so that the movement of sensor 520 is due only to PES control signal 510.

The total movement 528 of sensor 520 is related to the control induced movement 530 of the head by a gain 532. The position of the head, as represented by position signal 504, is also effected by wind induced resonance 534, that is not coherent with the movement of sensor 520.

In dual-stage servo loop 500 of FIG. 6, the inner servo loop formed by sensor 520 and sensor control unit 514, can operate at a higher frequency than the outer servo loop that utilizes position signal 504 and position error signal control 508. This allows for the cancellation of wind induced resonant vibrations that are beyond the bandwidth of the position error signal feedback loop.

The effects of the inner feedback loop of FIG. 6 are shown in FIGS. 7 and 8. FIGS. 7 and 8 provide graphs of the magnitude and phase, respectively, of the transfer function from control signal 510 to head position 530. In FIG. 7, frequency is shown along horizontal axis 700 and the magnitude of the transfer function in decibels is shown along vertical axis 702. In FIG. 8, frequency is shown along horizontal axis 800 and phase is shown along vertical axis 802.

FIG. 7 includes two graphs 704 and 706 of the magnitude of the transfer function and FIG. 8 includes two graphs 804 and 806 of the phase of the transfer function. Graphs 704 and 804 show the magnitude and phase of transfer function across a span of frequencies when the inner servo loop is not active. As can be seen from graph 704, the magnitude includes two peaks 708 and 710 that correspond to the resonant modes of the suspension.

Graphs 706 and 806 show the magnitude and phase of the transfer function when the inner servo loop is active. As can be seen in FIG. 7, peaks 708 and 710 have been removed with the activation of the inner servo loop. As can be seen in FIG. 8, the inner servo loop has also removed a phase reversal in the phase graph. By eliminating this phase reversal, the inner servo loop allows for possibly greater bandwidth in the operation of the outer servo loop.

In summary, a method for reducing off-track motion in a storage device 100 is provided. The method includes sensing movement with a sensor 301 located on a suspension assembly 200 of the storage device 100. A sensor signal 418 is generated based on the sensed movement. The sensor signal 418 is then used to reduce off-track motion.

In other embodiments, a method of dampening resonant modes in a storage device 100 is provided. The method includes sensing movement with a sensor 301 located on a suspension assembly 200 of the storage device 100. A sensor signal 518 is generated based on the sensed movement. The sensor signal 518 is then used to dampen at least one resonant mode.

The invention also provides for a data storage device 100 for reading from a storage medium 106. The data storage device includes a head 110 and a suspension assembly 200 that supports the head 110. At least one actuator 118, 320, 322 moves the head by moving at least part of the suspension assembly 200. A sensor 301 mounted on the suspension assembly generates a sensor signal 418, 518 that is indicative of movement of the suspension assembly 200. Sensor signal 418, 518 is provided to a servo circuit that generates a control signal 407, 516 for at least one actuator based in part on the sensor signal 418, 518.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the suspension sensor and servo system while maintaining substantially the same functionality without departing from the scope and spirit of the present invention. In addition, although the preferred embodiment described herein is directed to a servo system for a disc drive system, it will be appreciated by those skilled in the art that the teachings of the present invention can be applied to other systems, like tape drives or optical drive systems, without departing from the scope and spirit of the present invention.

What is claimed is:

1. A method for reducing off-track motion, the method comprising steps of:
   (a) sensing movement with a sensor located on a suspension assembly of the storage device;
   (b) generating a sensor signal based on the sensed movement; and
   (c) using the sensor signal to reduce off-track motion through steps comprising:
   (c) (1) applying the sensor signal to a suspension sensor filter to generate a sensor control signal;
   (c) (2) applying the sensor control signal to one or more actuators to position a head; and
   (c) (3) applying the sensor control signal to a feedback loop to reduce the effects of the sensor control signal on the sensor signal.

2. The method of claim 1 wherein applying the sensor signal to a suspension sensor filter comprises applying the sensor signal to a suspension sensor filter that is adaptively modified by a control system.

3. The method of claim 2 wherein the control system adaptively modifies the control filter through a gradient algorithm.

4. The method of claim 2 wherein the control system adaptively modifies the control filter using a neural network.

5. The method of claim 2 wherein the control system adaptively modifies the control filter using a fuzzy logic controller.

6. A method of dampening resonant modes in a storage device, the method comprising steps of:
   (a) sensing movement with a sensor located on a suspension assembly of the storage device;
   (b) generating a sensor signal based on the sensed movement; and
   (c) using the sensor signal to dampen at least one resonant mode through steps comprising:
   (c) (1) applying the sensor signal to a suspension sensor filter to generate a sensor control signal;
   (c) (2) applying the sensor control signal to one or more actuators to position a head; and
   (c) (3) applying the sensor control signal to a feedback loop to reduce the effects of the sensor control signal on the sensor signal.

7. A data storage device for reading from a storage medium, the data storage device comprising:
   a head for reading from the storage medium;
   a suspension assembly that supports the head;
   at least one actuator that moves the head by moving at least part of the suspension assembly;
   a sensor mounted on the suspension assembly that generates a sensor signal indicative of movement of the suspension assembly; and
   a servo circuit that generates a control signal for the at least one actuator based at least in part on the sensor signal, the servo circuit comprising a stabilizing feedback unit that reduces the effects of the control signal on the sensor signal.

8. The data storage device of claim 7 wherein the servo circuit comprises a suspension sensor filter that generates a sensor component of the control signal based on the sensor signal.

9. The data storage device of claim 8 wherein the servo circuit further comprises an adaptation component that adjusts the parameters of the suspension sensor filter.

10. The data storage device of claim 7 wherein the sensor is a MEMS accelerometer.

11. The data storage device of claim 7 wherein the sensor is a pressure sensor.

12. The data storage device of claim 7 wherein the sensor is a capacitive plate position sensor.

13. The data storage device of claim 7 wherein the sensor is a MEMS-based piezo-resistive sensor.

14. The data storage device of claim 7 wherein the sensor is a PVDF film sensor.

15. A disc drive for reading data from a storage medium, the disc drive comprising:
   a suspension assembly for positioning a head over the storage medium, the suspension assembly supporting at least one suspension sensor; and
   control means coupled to the suspension sensor for utilizing a sensor signal from the suspension sensor to reduce off-track motion of the head by generating a control signal and for using the control signal to limit the effects of the control signal on the sensor signal.

* * * * *